US008886604B2

(12) United States Patent
Vasquez et al.

(10) Patent No.: US 8,886,604 B2
(45) Date of Patent: *Nov. 11, 2014

(54) CUSTOMER SERVICE CONTACT (75) Inventors: Juan Vasquez, Gibsonton, FL (US); Prashant Desai, Land O Lakes, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/885,755

(22) Filed: Sep. 20, 2010

(65) Prior Publication Data

US 2012/0072440 A1  Mar. 22, 2012

(51) Int. Cl.
*G06F 17/30* (2006.01)
*G06Q 30/06* (2012.01)

(52) U.S. Cl.
CPC ............ *G06Q 30/0615* (2013.01)
USPC .......................................... 707/636

(58) Field of Classification Search
USPC .......................................... 707/636
See application file for complete search history.

(56) References Cited

U.S. PATENT DOCUMENTS

| 6,748,418 | B1* | 6/2004 | Yoshida et al. | 709/204 |
| 6,965,870 | B1* | 11/2005 | Petras et al. | 705/14.54 |
| 8,176,553 | B1* | 5/2012 | Magdych et al. | 726/23 |
| 2002/0161657 | A1* | 10/2002 | Kojac et al. | 705/26 |
| 2004/0158630 | A1* | 8/2004 | Chang et al. | 709/224 |
| 2005/0102358 | A1* | 5/2005 | Gold et al. | 709/204 |
| 2006/0211414 | A1* | 9/2006 | Luffman et al. | 455/423 |
| 2007/0088687 | A1* | 4/2007 | Bromm et al. | 707/4 |
| 2007/0245414 | A1* | 10/2007 | Chan et al. | 726/12 |
| 2008/0120125 | A1* | 5/2008 | Chavez | 705/1 |
| 2008/0120164 | A1* | 5/2008 | Hassler | 705/9 |
| 2008/0172574 | A1* | 7/2008 | Fisher | 714/25 |

* cited by examiner

Primary Examiner — Baoquoc N To (57) ABSTRACT

A method may include receiving session control protocol messages to establish a session between a workstation and a user device. The session control protocol messages may include context information. The context information may include a browser history associated with the user of the user device. The method may further include establishing the session between the workstation and the user device. Further, the method may include displaying information on a display for an operator of the workstation, wherein the displayed information is based on the received context information.

22 Claims, 11 Drawing Sheets

CUSTOMER SERVICE CONTACT

BACKGROUND INFORMATION

Television viewers have access to an ever-growing amount and variety of content. For example, a viewer may choose between pay-per-view programs, on-demand programs, interactive games, music, broadcast television programs, etc. While selecting from this wide variety of content, the viewer may face issues (e.g., a technical problem or an issue with his account) for which he would like to speak to a customer service agent.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Figure 1:
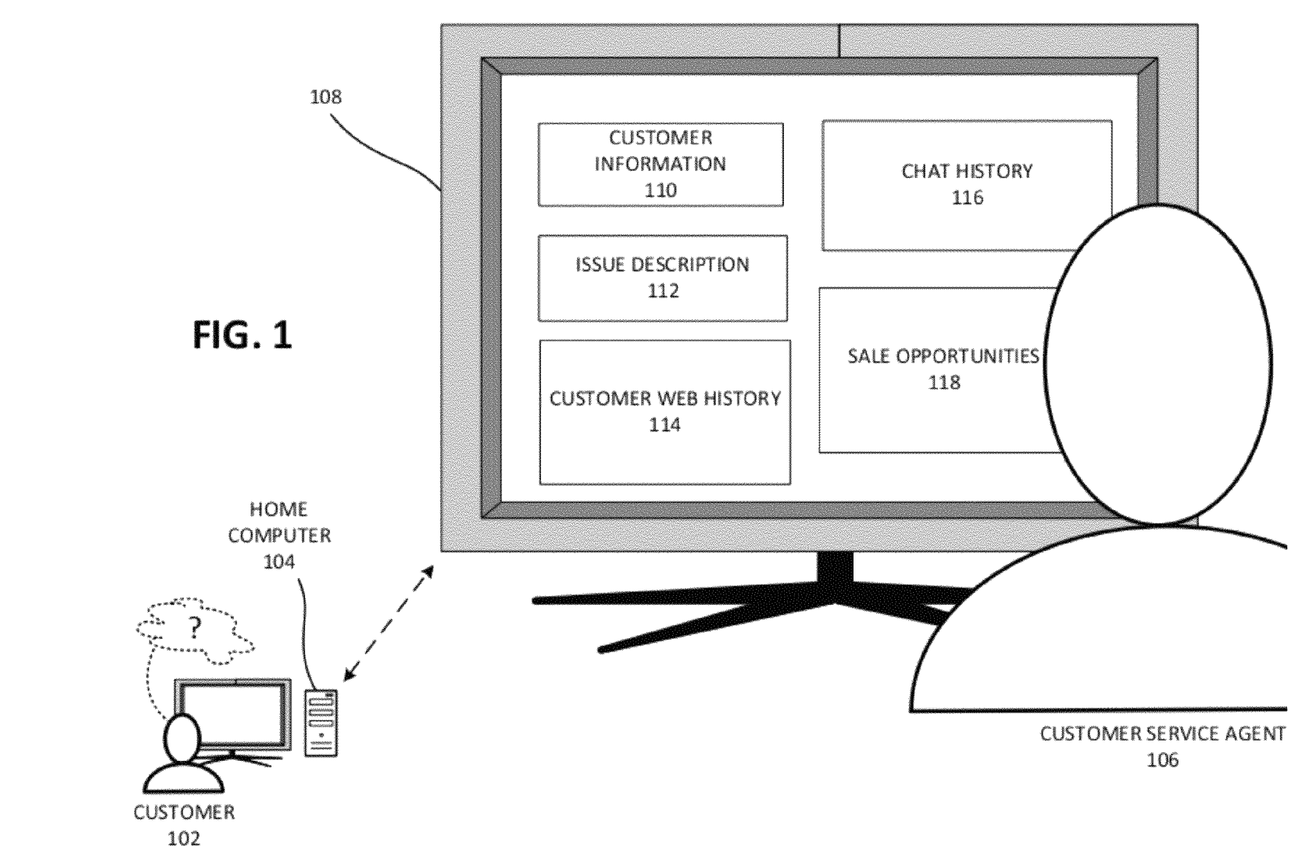
FIG. 1 is a diagram of an overview of an exemplary embodiment.

Embodiments disclosed herein may allow for a customer to establish a call with a customer service agent when the customer is experiencing an issue or problem. FIG. 1 is a diagram showing an example of one embodiment. FIG. 1 shows a customer 102 at home in front of a home computer 104 with a display. Customer 102 may, for example, be surfing the web for products offered by a merchant with an online presence. As shown, however, customer 102 has a question or issue that he cannot resolve himself and that may require intervention from a customer service agent. For example, customer 102 may want to buy a new mobile phone, but the new phone may require a new service plan that is not compatible with his current service plan, and a customer service agent is needed to resolve the conflict. In one embodiment, customer 102 may be able to engage the customer service agent in an instant-message (IM) chat on the display of home computer 104. In this example, if the IM chat session does not resolve the issue, the issue can be elevated to an audio and/or video call between customer 102 and a customer service agent 106. Customer service agent 106 may be presented with information on a display 108 describing the context of the call with customer 102, such as customer information 110 (e.g., name, location, account type), a description of the issue 112, a history of the IM chat with the customer 116, the customer's web browsing history 114 (e.g., what mobile phone products the customer viewed), and sale opportunities 118 for the customer service agent to offer to the customer. Thus, the customer service agent is presented with what will be the purpose or meaning of the conversation with the customer. In one embodiment, the customer may engage the customer service agent over home computer 104 or have the call directed to a phone, such as his home phone or mobile phone. In another embodiment, the call with the customer may be routed to the customer service agent based on the context information.

Figure 2:
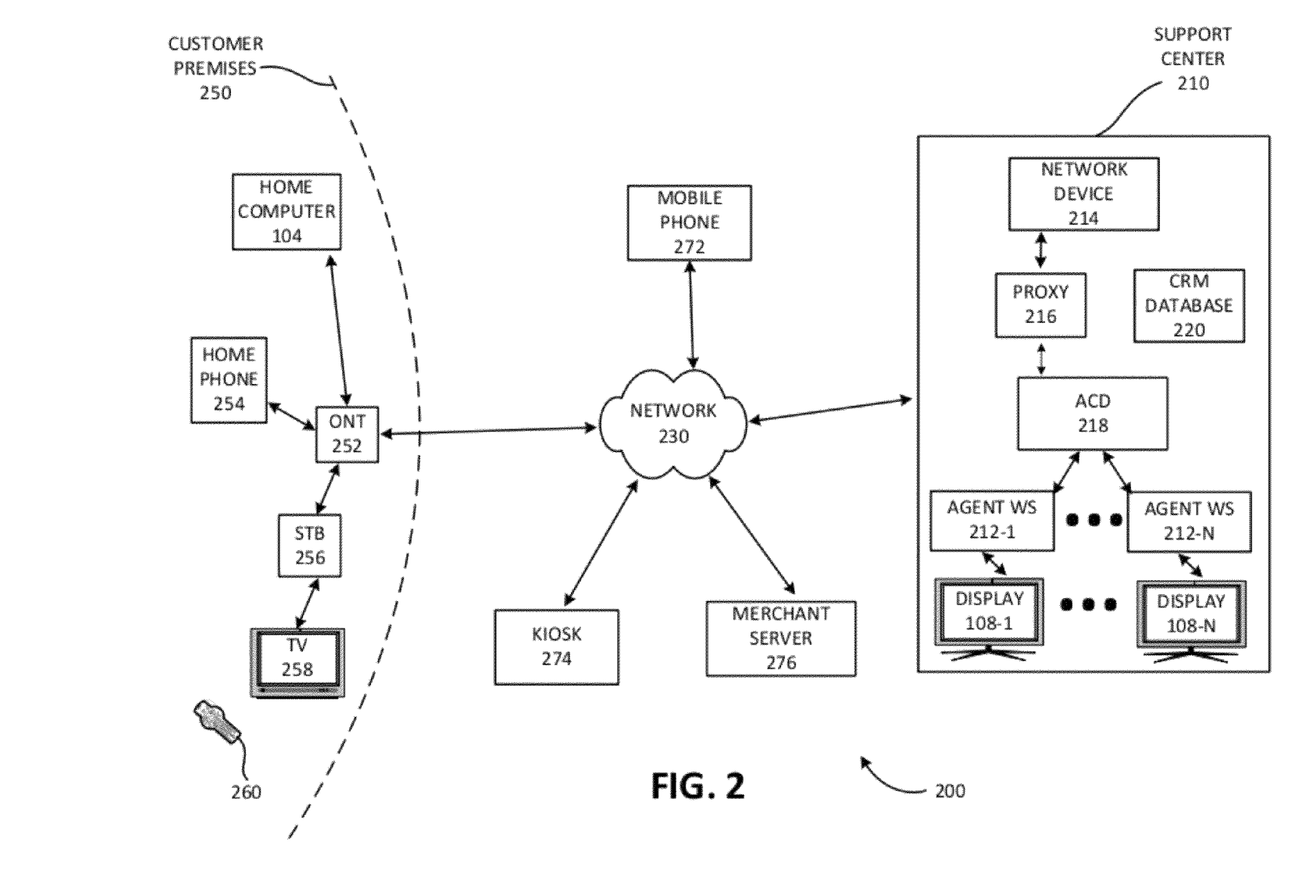
FIG. 2 is a diagram of an exemplary network for implementing different embodiments.

FIG. 2 is a diagram of an exemplary network 200 for implementing the embodiment of FIG. 1 and other embodiments. Network 200 may include a support center 210, customer premises 250, a network 230, a mobile phone 272, a kiosk 274, and a merchant server 276. Customer premises 250 (e.g., the customer's home) may include home computer 104, a TV 258, an optical network terminal (ONT) 252, a set-top box (STB) 256, a home phone 254, and a remote control 260. Devices in customer premises 250, such as home computer 104, home phone 254, STB 256, remote control 260, and TV 258 may each be considered a "user device."

ONT 252 may receive data, e.g., on a fiber optic cable, and may transfer the data to the appropriate device in customer premises 250, such as computer 104 or STB 256. Likewise, ONT 252 may receive data from any device in customer premises 250 and may transmit the data to other devices in network 200, e.g., through a fiber optic cable. ONT 252 may provide customer premises 250 with Internet access, television access, or telephone service, for example.

STB 256 may receive content and output the content to TV 258 for display. STB 256 may include a component (e.g., a cable card or a software application) that plugs into a host device (e.g., a personal computer, TV 258, a stereo system, etc.) that allows the host device to display content. STB 256 may also be implemented as a home theater personal computer (HTPC), an optical disk player (e.g., digital video disk (DVD) or Blu-Ray (™) disc player), a cable card, etc. STB 256 may receive commands from other devices in network 200, such as remote control 260. In one embodiment, STB 256 may include a microphone and/or a camera.

TV 258 may include speakers as well as a display. TV 258 may play content, for example, received from STB 256. TV 258 may also act as a monitor to a home computer (e.g., a home theater personal computer). Remote control 260 may issue wired or wireless commands for controlling other electronic devices, such as TV 258 or STB 256. Remote control 260, in conjunction with STB 256, may allow a user to interact with an application running on STB 256. Other types of devices (e.g., a keyboard, mouse, mobile phone, etc.) may be used instead of remote control 260.

Computer 104 may include a laptop, a desktop, a mobile telephone, a personal digital assistant (PDA), or another portable communication device. Computer 104 may include a microphone for capturing audio and/or a camera for capturing images or video. Computer 104 may also include a display for showing images or video or a speaker for playing audio. Computer 104 may include one or more computing modules for hosting programs, such as a web browser, other applications, or a database, for example.

Customer premises 250 may connect to network 230. Network 230 may deliver content and data to customer premises 250 and may receive data from customer premises 250 for forwarding to the proper destination (e.g., support center 210). Network 230 may include a content server for transcoding and multiplexing content from different sources for delivery to customer premises 250. Network 230, support center 210, and other devices in network 200 may form part of a high-speed fiber optic network (e.g., FiOS™).

Mobile phone 272 may include a radiotelephone, a personal communications system (PCS) terminal, a personal digital assistant (PDA), a laptop, or another portable communication device. Mobile phone 272 may communicate with other devices via one or more communication towers (not shown) using a wireless communication protocol, e.g., GSM (Global System for Mobile Communications), CDMA (Code-Division Multiple Access), WCDMA (Wideband CDMA), IEEE 802.11x, etc. Mobile phone 272 may be associated with a phone number, such as 202-262-3759. Like the devices in customer premises 250, mobile phone 272 may also be considered a "user device."

Kiosk 274 may include one or more computers for hosting programs, such as a web browser, a database, or other applications. Kiosk 274 may include a display, a keyboard, a microphone, and a speaker. Kiosk 274 may include a handset with an integrated speaker and microphone. Kiosk 274 may be used, for example, as an automatic teller machine (ATM), a ticket machine, a calling card charging station, etc. Like the devices in customer premises 250, Kiosk 274 may also be considered a "user device."

Support center 210 may include one or more servers (e.g., "network devices") that manage and/or store information associated with providing customer service to customers. As shown in FIG. 2, support center 210 may include a network device 214, a proxy 216, an automatic call distributor (ACD) 218, a customer relations management (CRM) database 220, and agent workstations 212-1 through 212-N (collectively workstations 212, individually workstation 212-$x$).

Network device 214 may include one or more devices that allow different data networks to communicate and cooperatively carry traffic. For example, network device 214 may adapt SS7 signaling to session initiation protocol (SIP) signaling, H.323 protocol signaling, or other protocol signaling used by other devices in network 200. In one implementation, network device 214 may convert time division multiplexed (TDM) encoded voice signals to packetized data suitable for transport to and processing by a proxy device, such as proxy 216. Network device 214 may include a gateway that provides for compatibility at two levels, e.g., between different signaling schemes and between different media forms.

Network device 214 may also include one or more session border controllers (SBCs) that provide control of the boundary between different service provider networks, provide signaling protocol compatibility between an IP-based network and other service provider networks, or control the transport boundary between service provider networks. In one embodiment, network device 214 may correspond to an ingress point to proxy 216.

Proxy 216 may provide signaling services to establish sessions between devices, such as home phone 254 and a workstation 212-$x$. Proxy 216 may include a server or computer that is able to receive data from network device 214 and forward the received data to an appropriate device, such as ACD 218 using a session signaling protocol, such as SIP or H.323. Proxy 216 may also receive data from ACD 218 and forward the received data to other devices, such as network device 214, for example.

ACD 218 may distribute calls to one of workstations 212. ACD 218 is illustrated as external to proxy 216. In some implementations, ACD 218 may be part of proxy 216. ACD 218 may forward calls to one of workstations 212 according to an algorithm. The algorithm may be based on which of workstations 212 has an available customer service agent, the experience of the customer service agent, the type of call, the type of customer, the type of issue or problem the customer is experiencing, etc.

Workstation 212-$x$ may include a computer for a customer service agent to use for handling calls from customers that may benefit from human intervention. Workstation 212-$x$ may include a display, a telephone, a camera, a microphone, a speaker, and/or a headset including a microphone and speaker. Workstation 212-$x$ may also include a software-implemented telephone (e.g., a "soft" phone) or a hardware implemented telephone (e.g., a "hard" phone). Workstation 212-$x$ may also include software or hardware for performing packet-based data transmission to transmit data such as voice, video, or text. Workstation 212-1 may include, for example, display 108 shown in FIG. 2.

CRM database 220 may include information about customers. For example, CRM database 220 may include a database of customer names, account numbers, transactions, addresses, transaction history, billing information, etc. CRM database 220 may also include information about issues or problems the customer has had, for example, with services or products offered by a service provider or merchant. A description of the issue or problem, the steps the customer and customer service agent have taken to resolve the problem, and the resolution may be stored in CRM database 220.

Network 230 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of transmitting data. Network 230 may include a circuit-switched network, such as a public-switched telephone network (PSTN) for providing telephone services for traditional telephones. Network 230 may allow devices at customer premises 250 (e.g., a computer or a set-top box) to connect to other devices also attached to network 230, such as merchant server 276 or other customers (not shown).

The exemplary configuration of devices in network 200 is illustrated for simplicity. Network 200 may include more devices, fewer devices, or a different configuration of devices than illustrated in FIG. 2. For example, network 200 may include thousands or millions of customer premises. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
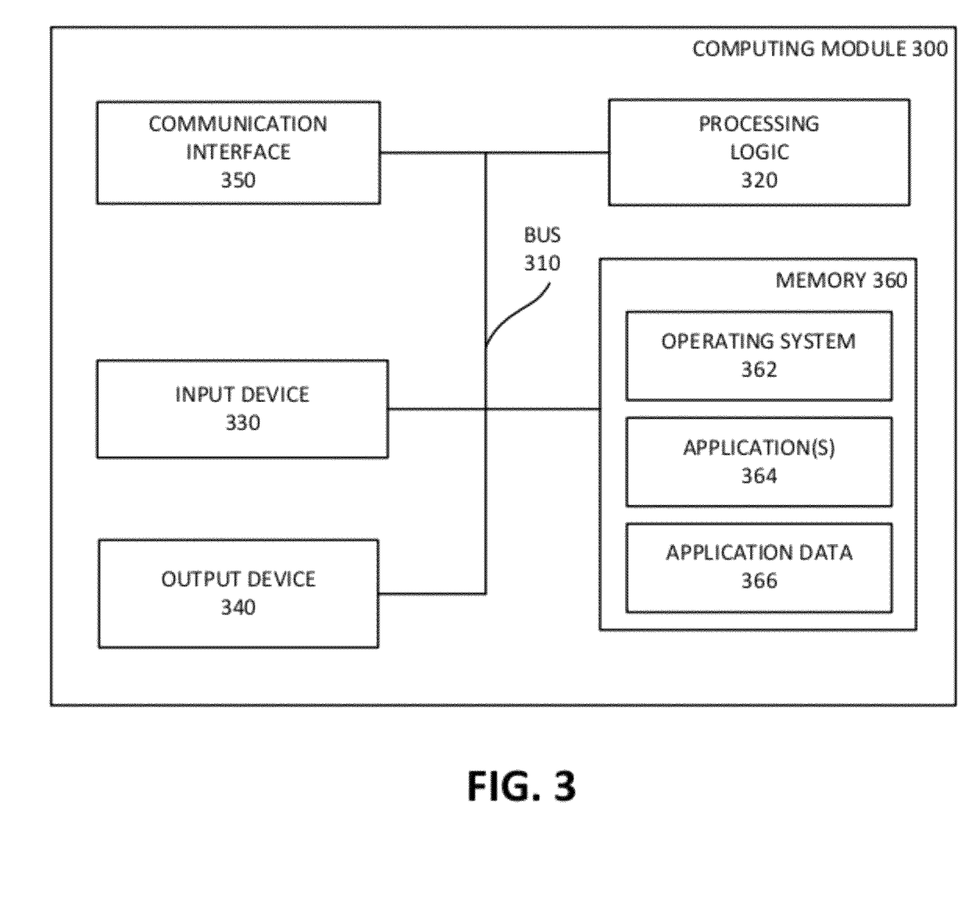
FIG. 3 is a block diagram of exemplary components of a computing module.

Devices in network 200 may each include one or more computing modules. FIG. 3 is a block diagram of exemplary components of a computing module 300. Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), etc.

Input device 330 may allow a user to input information into computing module 300. Input device 330 may include a keyboard, a mouse, a pen, a microphone, a remote control (e.g., remote control 260), an audio capture device, an image and/or video capture device, a touch-screen display, etc. Some devices, such as devices 214-220 may be managed remotely and may not include input device 330. In other words, some devices may be "headless" and may not include a keyboard, for example.

Output device 340 may output information to the user. Output device 340 may include a display, a printer, a speaker, etc. For example, TV 258 includes a display (an output device), which may include a liquid-crystal display (LCD) for displaying content to the user. As another example, ONT 252 and STB 256 may include light-emitting diodes (LEDs). Headless devices, such as devices 214-220, may be managed remotely and may not include output device 340.

Input device 330 and output device 340 may allow a user to activate and interact with a particular service or application, such as an interactive application. Input device 330 and output device 340 may allow a user to receive and view a menu of options and select from the menu options. The menu may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RF) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., application(s) 364 and operating system 362) and data (e.g., application data 366) for use by processing logic 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 362 may include software instructions for managing hardware and software resources of computing module 300. For example, operating system 362 may include Linux, Windows, OS X, Android, an embedded operating system, etc. Application(s) 364 and application data 366 may provide network services or user services, depending on the device in which the particular computing module 300 is found.

Computing module 300 may perform the operations described herein in response to processing logic 320 executing software instructions contained in a computer-readable medium, such as memory 360. A computer-readable medium includes a physical or logical memory device. The software instructions may be read into memory 360 from another computer-readable medium or from another device via communication interface 350. The software instructions contained in memory 360 may cause processing logic 320 to perform processes that are described herein.

Figure 4A:
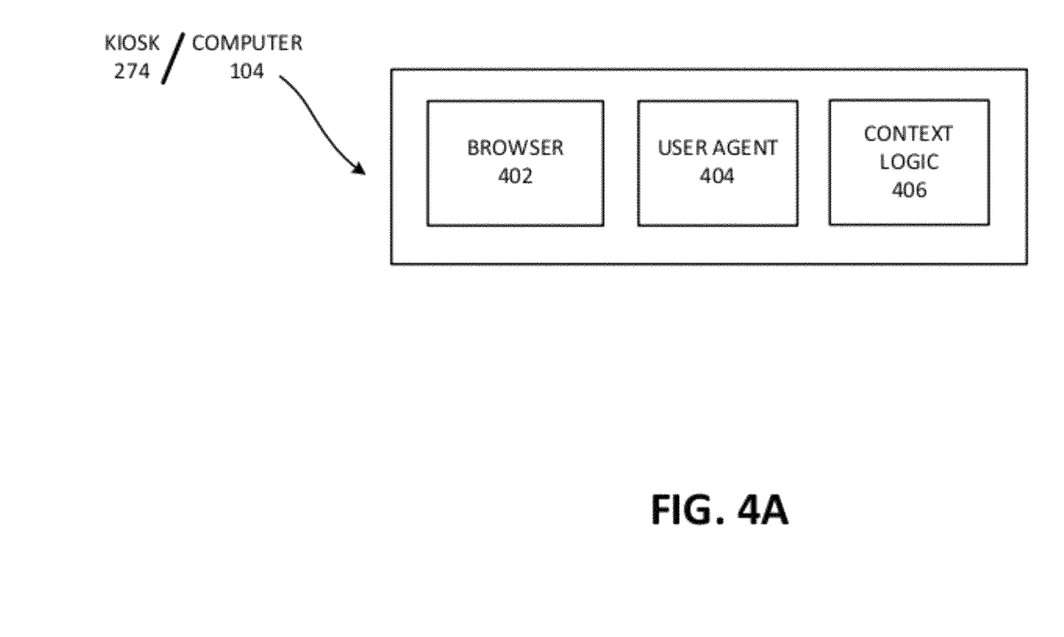
FIG. 4A is a block diagram of exemplary components of the home computer or kiosk of FIG. 2.

As described above, home computer 104 may allow a user to establish a call with a customer service agent. FIG. 4A is a block diagram of exemplary components of home computer 104 (e.g., functions performed by application(s) 364 in processing logic 320 or stored in memory 360 of STB 256). Home computer 104 may include a browser 402, a user agent 404, and context logic 404. Kiosk 274 may be configured similarly to home computer 104.

Browser 402 may allow the user to navigate the world-wide web (e.g., using the Internet) and visit web sites served by merchant server 276, for example. Browser 402 may include a JavaScript engine to run and interpret a JavaScript application. Browser 402 may include other types of engines, such as a Java Virtual Machine to run Java applications or a virtual machine to run Adobe Flash applications. Browser 402 may allow the user to browse for and purchase services and merchandise offered by merchant server 276, for example. Browser 402 may interpret hypertext markup language (HTML) (e.g., HTML5).

User agent 404 may implement a session signaling protocol, such as SIP, H.323, SIP for Instant Messaging and Presence Leveraging Extensions (SIMPLE), or XMPP (Extensible Messaging and Presence Protocol) for creating chat, data, or media sessions between network devices. As a SIP user agent, for example, user agent 404 may create or receive SIP messages to manage a SIP session. In one embodiment, user agent 404 may perform the role of a SIP client, which sends SIP requests, or a SIP server, which receives the requests and returns SIP responses. In one embodiment, user agent 404 may also allow for an IM chat with another party, such as a customer service agent located at one of workstations 212. In one embodiment, user agent 404 may be incorporated into browser 402 in a JavaScript application, a Java application, an Adobe Flash application, HTML5, etc.

Context logic 406 may determine the context (e.g., the context of a browser session) for transmitting to support center 210 when the user establishes a call with a customer service agent. Context logic 406 may interoperate with user agent 404 to insert the context data into a header of a session signaling protocol messages, such as a SIP message. The context data may include browsing history, a transaction identifier (ID), a transaction history, a transaction name, a customer name, etc., associated with a failed transaction, for example.

Figure 4B:
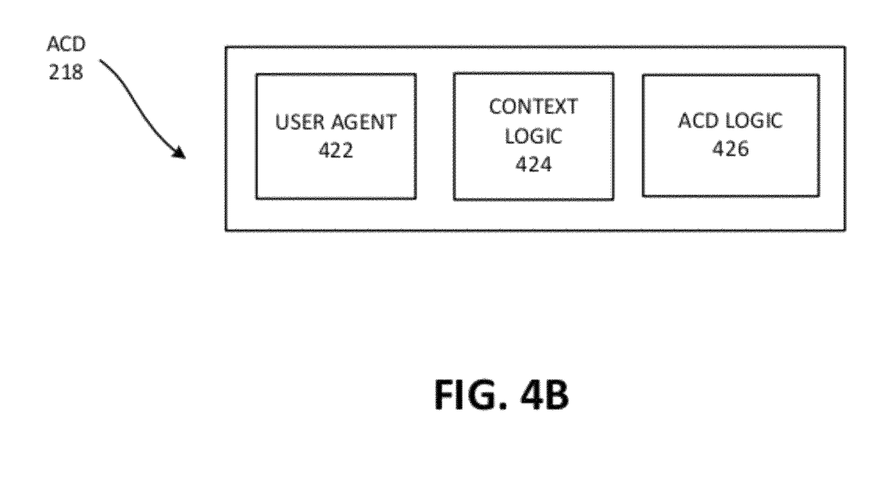
FIG. 4B is a block diagram of exemplary components of the automatic call distributor (ACD) of FIG. 2.

As described above, ACD 218 may distribute calls established by a customer to one of a group of workstations and customer service agents. FIG. 4B is a block diagram of exemplary components of ACD 218 (e.g., functions performed by application(s) 364 in processing logic 320 or stored in memory 360 of ACD 218). ACD 218 may include a user agent 422, context logic 424, and ACD logic 426. User agent 422 may receive, interpret, and respond to session signaling message, such as SIP, H.323, SIMPLE, or XMPP for creating chat, data, or media sessions between network devices. Context logic 424 may read session signaling messages to extract and interpret context data inserted, for example, into message headers by, for example, a user device such as STB 256. ACD logic 426 may forward session signaling messages to the appropriate workstation 212-x or assist in establishing a session between a user device (e.g., home phone 254) and one of workstations 212.

Figure 4C:
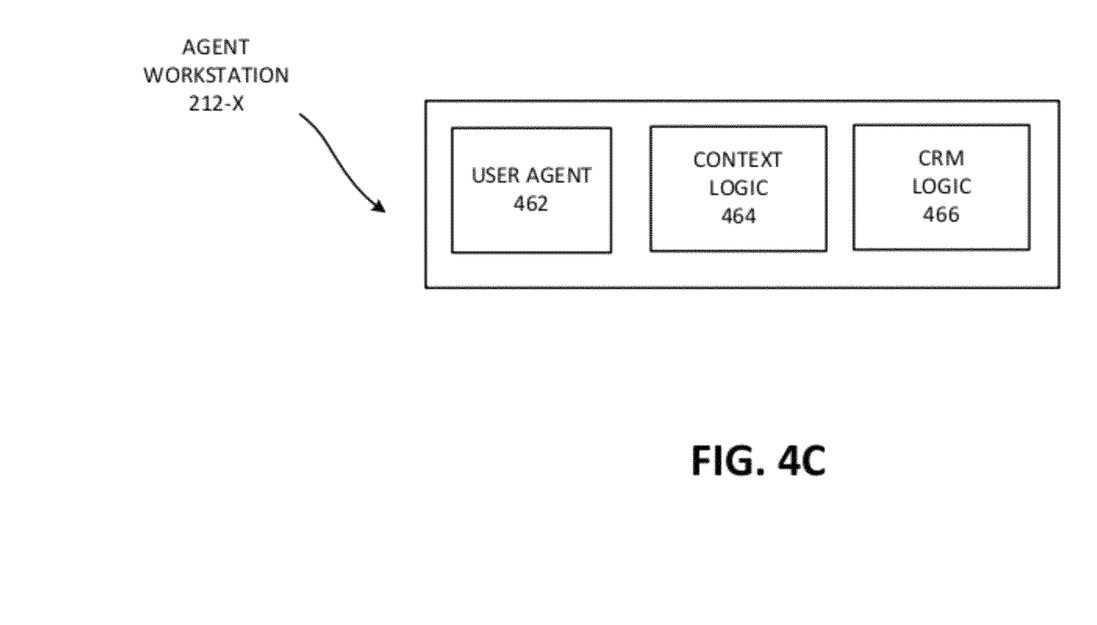
FIG. 4C is a block diagram of exemplary components of one of the workstations of FIG. 2.

As also described above, workstation 212-x may receive calls or place calls established by a customer. A customer service agent may sit at workstation 212-x, for example, to talk to a customer about resolving issues with an account or transaction. FIG. 4C is a block diagram of exemplary components of workstation 212-x (e.g., functions performed by application(s) 364 in processing logic 320 or stored in memory 360 of workstation 212-x). Workstation 212-x may include a user agent 462, context logic 464, and CRM logic 466. User agent 462 may receive, interpret, and respond to session signaling messages, such as SIP messages. Context logic 464 may read session signaling messages to extract and interpret context data, for example, inserted into message headers by a user device such as STB 256. Context logic 464 may display context information to the customer service agent so that the customer service agent may better help the customer. CRM logic 466 may allow the customer service agent to access and update customer information stored in CRM database 220.

Figure 5:
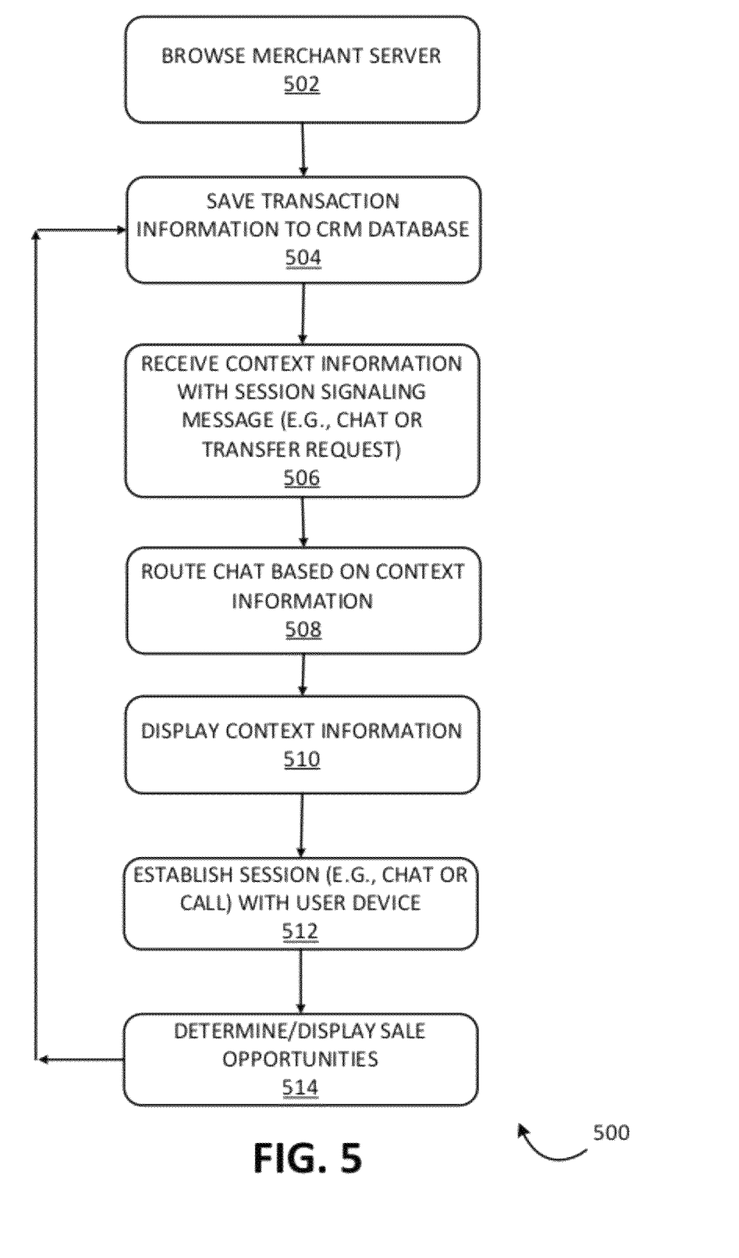
FIG. 5 is a flowchart of an exemplary process for establishing a chat and/or a call between one or more customer service agents and a customer.

Network 200 may allow for a user (e.g., customer) or a customer service agent to establish a communication session (e.g., a chat session or a phone call) with each other. FIG. 5 is a flowchart of a process 500 for establishing such a session. Process 500 is described with respect to FIGS. 6A and 6B, which are diagrams of exemplary messages passed between devices in network 200. The following example assumes that the user is at home sitting in front of home computer 104 and browsing (block 502) for service and/or merchandise from merchant server 276. Using browser 402 running on home computer 104, for example, the user attempts to purchase a new mobile phone at a special price. A problem occurs because, for example, the new phone at that special price requires a service contract that is incompatible with the user's current service contract. The information related to the user unsuccessful transaction, for example, may be stored (block 504) (e.g., by browser 402 or merchant server 276) in CRM database 220. The transaction information may include the type of issue or problem, a description of the issue or problem, a transaction ID, the transaction history, a customer ID, etc. At a later time, a customer service agent at one of workstations 212, for example, may be able to access CRM database 220 to help the user with any issue or problem.

Figure 6A:
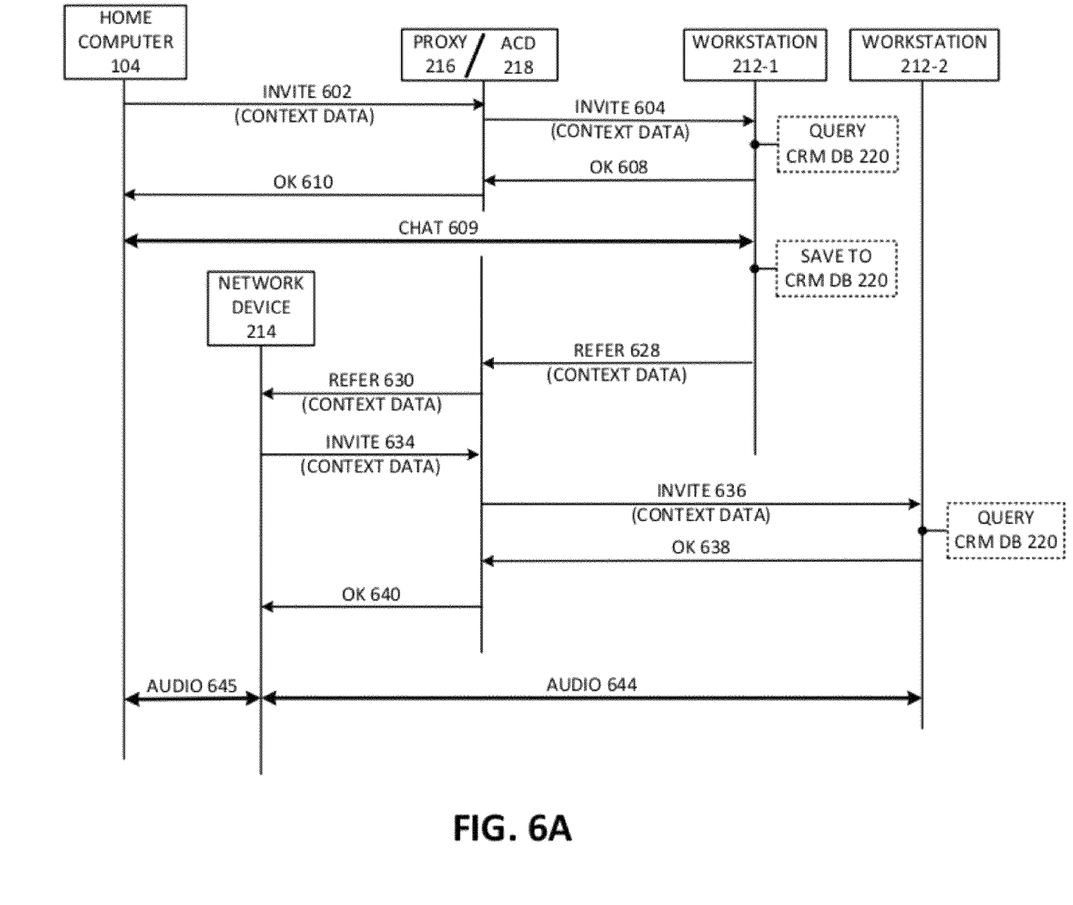
FIGS. 6A and 6B are diagrams of exemplary messages passed between devices in the network of FIG. 2.

Because of the issue the user is experiencing, the user may establish a chat with a customer service representative. Home computer 104 may send a session signaling message (e.g., an INVITE message), including context data, to support center 210 to establish a session (e.g., a chat session) with a customer service agent. The session signaling message, including the context data, may be received (block 506) in support center 210. The session signaling message may include a SIP INVITE message, for example, but other session signaling protocol messages are possible. The context data may include the context of the transaction (e.g., transaction ID, customer ID, transaction history, transaction type, description of problem or issue, browser history, etc.). For example, as shown in FIG. 6A, home computer 104 sends an INVITE message 602 to ACD 218. For ease of illustration, FIG. 6A shows ACD 218 and proxy 216 as one device. INVITE message 602 may include the context data in a header field. In one implementation, the context data may be in an extensible-markup language (XML) format.

Proxy 216 and/or ACD 218, in one embodiment, may not include the software and/or hardware to interpret the context data stored in the header fields. In this case, proxy 216 and/or ACD 218 may handle INVITE message 602 by ignoring the context data. Proxy 216 and/or ACD 218 may nonetheless forward the context data in the header of INVITE message 604. Such an implementation may be consistent with the SIP standard, for example.

On the other hand, in another embodiment, ACD 218 may include context logic 424. In this embodiment, the session signaling message may be routed based on the context information (block 508). Context logic 424 may inspect the context data stored in the header and ACD logic 426 may use the context data to select one of workstations 212 to establish a chat session between a customer service agent and home computer 104. For example, ACD logic 426 may inspect the context data and determine that the user's issue may be resolved by a particular customer service agent. To do this, ACD logic 426 may query a database (not shown) of the experience of customer service agents and compare the context information to the information in that database. As a result, in this example, ACD logic 426 may select workstation 212-1 with an agent having the appropriate experience to chat with the customer.

The session signaling message, including the context data, may be forwarded to the appropriate workstation. For example, ACD 218 selects workstation 212-1 and, as shown in FIG. 6A, forwards INVITE message 604 to workstation 212-1. INVITE message 604 may include, in its header, the context data from INVITE message 602. In this example, a customer service agent at workstation 212-1 may accept the chat, and, as shown in FIG. 6A, workstation 212-1 may respond with an OK message 608, which proxy 216 forwards as an OK message 610 to home computer 104.

Figure 7A:
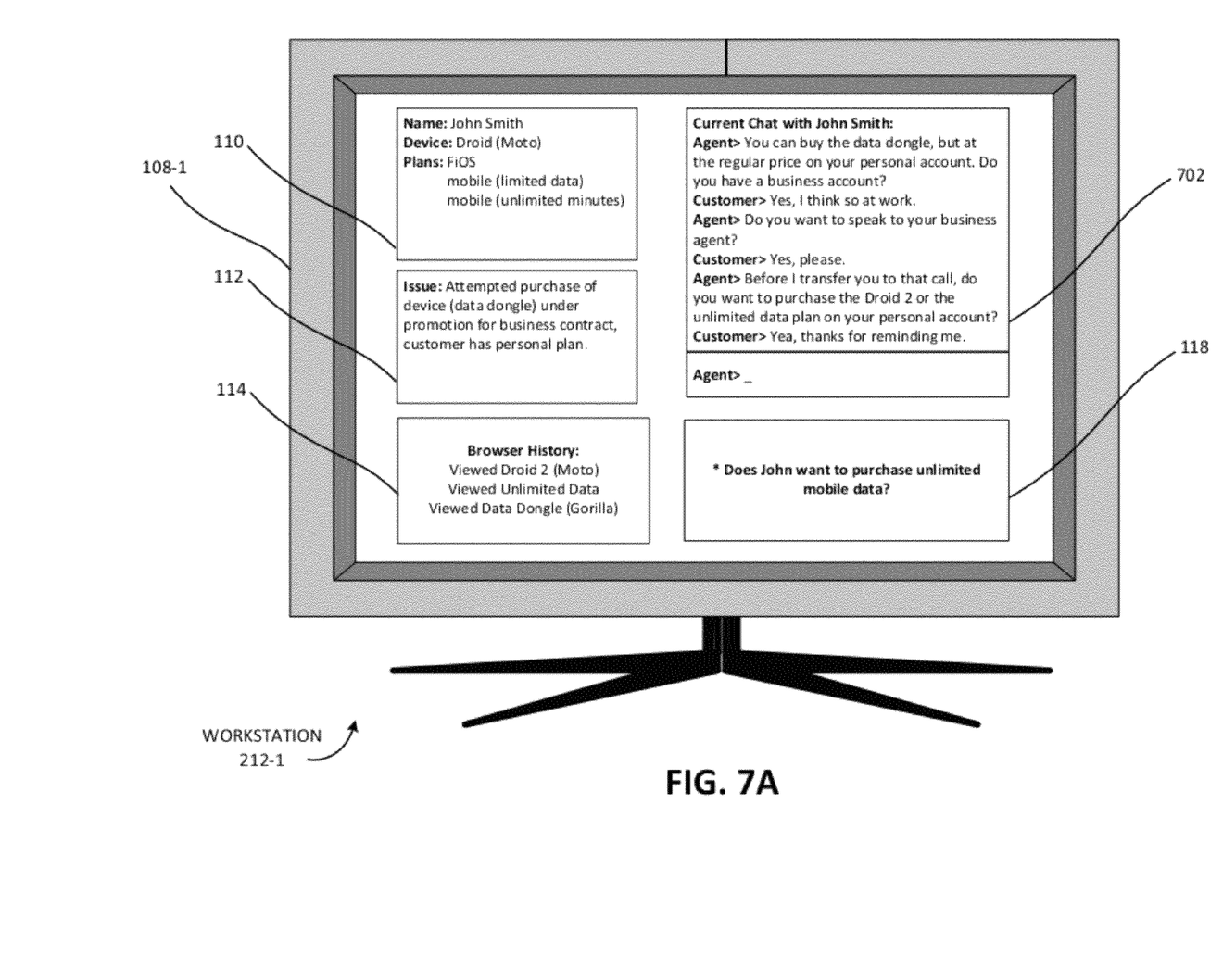
FIGS. 7A and 7B are diagrams of the display of the television of FIG. 1 in an exemplary embodiment.

Context logic 464 in workstation 212-1 may inspect the context data stored in the header information of INVITE message 604. Context information may be displayed on a display (block 510) associated with workstation 212-1. For example, the agent at workstation 212-1 may be able to view the name, transaction ID, transaction history, etc., that may be indicated in the context data of INVITE message 604. Thus, the customer service agent may become familiar with the user's issues before, immediately after, or during a conversation (e.g., a chat) with the user. This embodiment may save the user, for example, from having to explain his issue to the customer service agent. In addition, workstation 212-1 may query CRM database 220 so that the agent has full access to the customer's information, not just the context data stored in INVITE message 604. As shown in FIG. 7A, for example, workstation 212-1 receives the context information and displays the information on display 108-1 to the customer service agent. The context information may include customer information 110, a description of the issue 112, the customer's browsing history 114. Other context information may include a transaction identifier, transaction history, etc. Thus, the customer service agent may be shown the intended purpose or meaning of the session communications between the user and the agent. Further, the customer service agent may carry on an IM chat with the user, for example, in chat box 702. Display 108-1 may also display other information associated with the transaction.

In one embodiment, a chat session 609 may be established between workstation 212-1 and home computer 104 (block 512). While engaging in chat session 609, the customer service agent views display 108-1 (see FIG. 7A, customer information 110), which identifies John Smith (the user) who subscribes to FiOS™, a limited mobile data plan, and an unlimited calling plan. Description of issue 112 indicates that John attempted to purchase a data dongle under a special promotion for business customers, but John was apparently logged into merchant server 276 with a personal account. Browsing history 114 indicates that John viewed the Droid 2™ device, viewed upgrading to an unlimited mobile data plan, and viewed the data dongle device. In one embodiment, browsing history 114 is limited to the browsing history of merchant server 276, the browsing history associated with a browsing session (e.g., John may be logged into a personal account), or the history associated with a tab in the browser. In addition, workstation 212-1 may query CRM database 220 so that the agent has full access to the customer information.

Sale opportunities may be determined and displayed (block 514). In this embodiment, workstation 212-1 may analyze the context information (e.g., browsing history 114) to determine any sale opportunities by, for example, comparing the browsing history to a list of high-value sale opportunities. In the example of FIG. 7A, John browsed information about the Droid 2™ device and an unlimited mobile data plan. This information may be compared to a list of high-value sale opportunities that, in this case, include (1) an unlimited data plan for customers that do not have the plan; and (2) a Droid 2™ device for customers that have a term contract expiring within the next 30 days. Comparing John's browsing history to this list of opportunities, workstation 212-1 determines that the customer service agent should not offer the Droid 2™ to John because John's term contract is not within 30 days of expiring (e.g., John just bought the Droid™ not knowing the Droid 2™ was about to be introduced). On the other hand, workstation 212-1 determines that John should be offered the opportunity to buy an unlimited data plan. As shown in FIG. 7A, display 108-1 includes sales opportunity dialog 118 that tells the customer service agent to offer John this opportunity. Fortunately, as shown in chat box 702, an otherwise lost sale is not lost because the customer service agent reminded John about the unlimited mobile data plan.

In another embodiment, chat messages may be transmitted between home computer 104 and workstation 212-1 without first establishing chat session 609 (e.g., each message may be carried independently and associated with other messages by the identity of the sender (e.g., by UA 404 and UA 422). In another embodiment, chat session 609 may be implemented using another protocol (e.g., XMPP) rather than SIP. In other embodiments, chat session 609 may include other types of media, such as video and/or audio.

The user may be transferred or connected to another session with another customer service representative because, for example, the first customer service agent may not be able to solve the issue presented by that user. John may be transferred to a business agent, for example, because the agent typing in chat box 702 may not be able to help John. Thus, if the agent at workstation 212-1 cannot resolve the issue, then that agent can transfer the user to the agent at workstation 212-2. In this case, the customer service agent may save the transaction information to CRM database (block 504). Further, workstation 212-1 may send a REFER message 628 to proxy 216. REFER message 628 may include context data. The context data may include the same information as transmitted in INVITE messages 602 and 604, for example. The context data may also include additional context data, such as the chat history between the user and the first customer service agent. Additional context data may also include the context of why the user's problem was not resolved with the first customer service agent. In yet another embodiment, the context data may include a count of the number of times that the user has been transferred to another workstation. For example, the context data in messages 628, 630, 634, and 636 may include a count of "1" because it is the first time, in this example, that the user has been transferred. In one embodiment, the context data and additional context data may be stored in the header of REFER message 628.

Proxy 216 may forward REFER message 628 to network device 214 as REFER message 630. REFER message 630 may also include context data. In one embodiment, proxy 216 ignores the context data and passes the context data from REFER message 628 to REFER message 630. For example, in one implementation, proxy 216 may not include any context logic (e.g., context logic 424). Referring back to FIG. 6A, network device 214 may receive REFER message 630 (e.g., rather than home computer 104) to ensure, for example, that network device 214 is standards compliant (e.g., SIP compliant) and forwards context data in header information. As shown in FIG. 6A, network device 214 sends an INVITE message 634 to ACD 218. Network device 214 may copy the context data from REFER message 630 (e.g., in the header of REFER message 630) to INVITE message 634. In this embodiment, network device 214 may copy the context data in the header of REFER message 630 to comply with the SIP standard.

ACD 218 may receive INVITE message 630 with the context data (block 506). ACD 218 may simply copy the context data from INVITE message 634 to INVITE message 636 to comply with the SIP standard. On the other hand, in one embodiment, ACD 218 includes context logic 424, as shown in FIG. 4B. In this embodiment, the request may be routed based on the context data (including the additional context data) (block 508). For example, ACD 218 may select workstation 212-2 based on the context data or additional context data. Referring back to FIG. 6A, ACD 218 forwards INVITE message 636 to workstation 212-2. INVITE message 636 may include, in its header, the context data from INVITE message 634.

Context logic 464 in workstation 212-2 may inspect the context data and/or additional context data stored in the header information of INVITE message 636. The context may be displayed by workstation 212-2 on display 108-2 (block 510). For example, display 108-2 may display the context information, such as customer information 110, a description of the issue 112, the customer's browsing history 114, or chat history 116. Other context information may include a transaction identifier, transaction history, etc. Thus, the customer service agent may be presented with the intended meaning or purpose of the session communications between the user and the agent. In addition, workstation 212-2 may query CRM database 220 so that the agent has full access to the customer information.

In this example, an agent at workstation 212-2 may pick up a ringing phone, and workstation 212-2 may respond with an OK message 638, which proxy 216 forwards as OK message 640 to network device 214. A media session 644 may be established (block 512) between workstation 212-2 and network device 214. Network device 214 may connect media session 644 to media session 645 in the appropriate fashion. Thus, a second session (e.g., an audio call) is established with home computer 104 (e.g., the user device) and workstation 212-2 (block 512). Network device 214 may also terminate chat session 609 between home computer 104 and workstation 212-1.

Figure 7B:
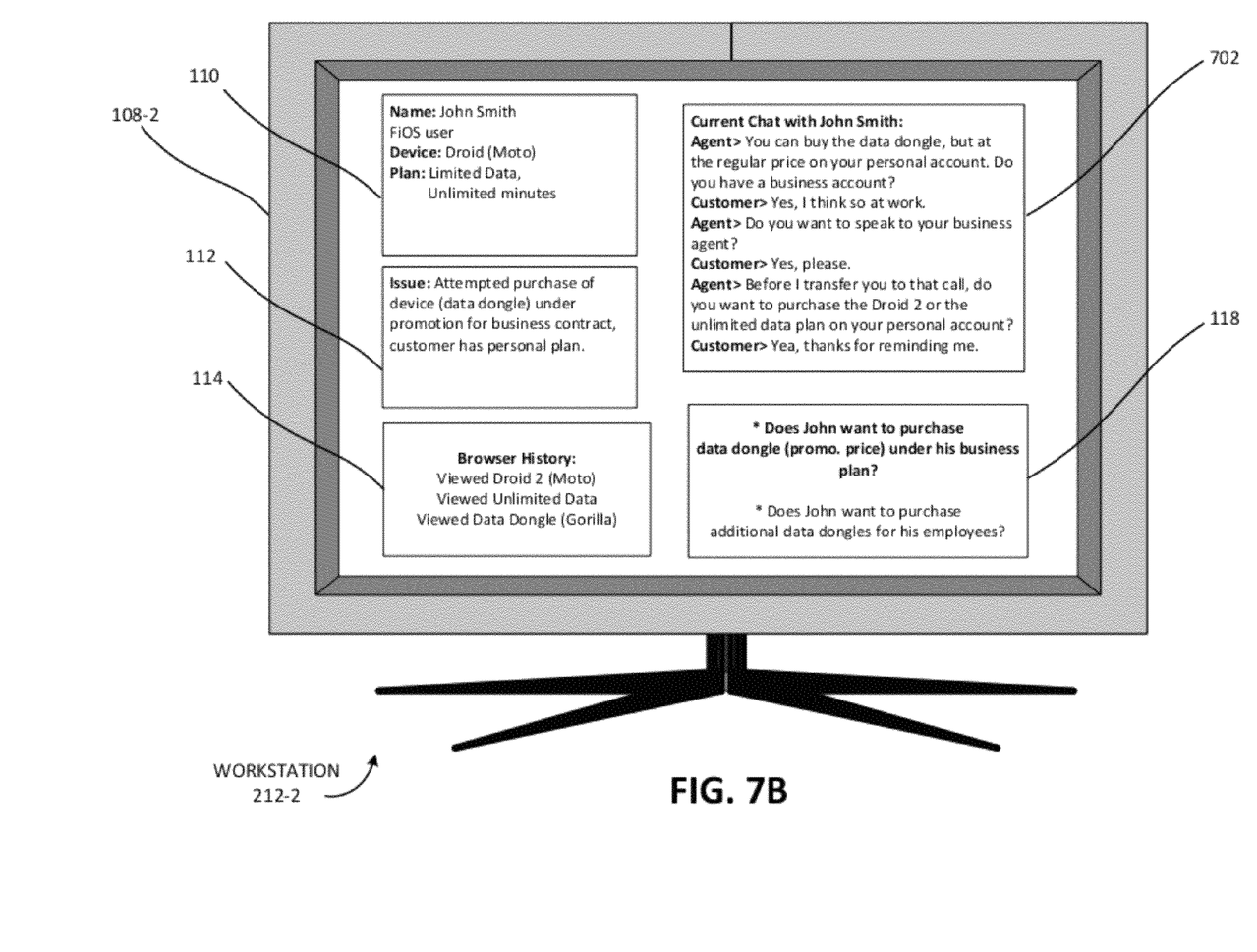

Sale opportunities may be determined and displayed (block 514). In this embodiment, workstation 212-2 may analyze the context information (e.g., browsing history) to determine any sale opportunities by, for example, comparing the browsing history to a list of high-value sale opportunities. In the current example, John browsed information about data dongle. This information may be compared to a list of high-value sale opportunities that, in this case, include (1) the purchase of a data dongle for the user; and (2) purchase of data dongles for other employees. Comparing John's browsing history to this list of opportunities, workstation 212-1 determines that the customer service agent should offer the data dongle for John and other employees that work with John. As shown in FIG. 7B, display 108-2 includes sales opportunity dialog 118-2 that tells the customer service agent to offer John this opportunity.

After the user discusses his issues or problems with the customer service agent at workstation 212-2, the customer service agent may wish to transfer the user to yet another customer service agent. In this case, blocks 502-514 may be repeated many times. In this case, the count of the number of transfers may be increased from "1" to "2," from "2" to "3," etc. The decision to route the transferred call may be based on the count, as the count forms part of the context data.

Figure 6B:
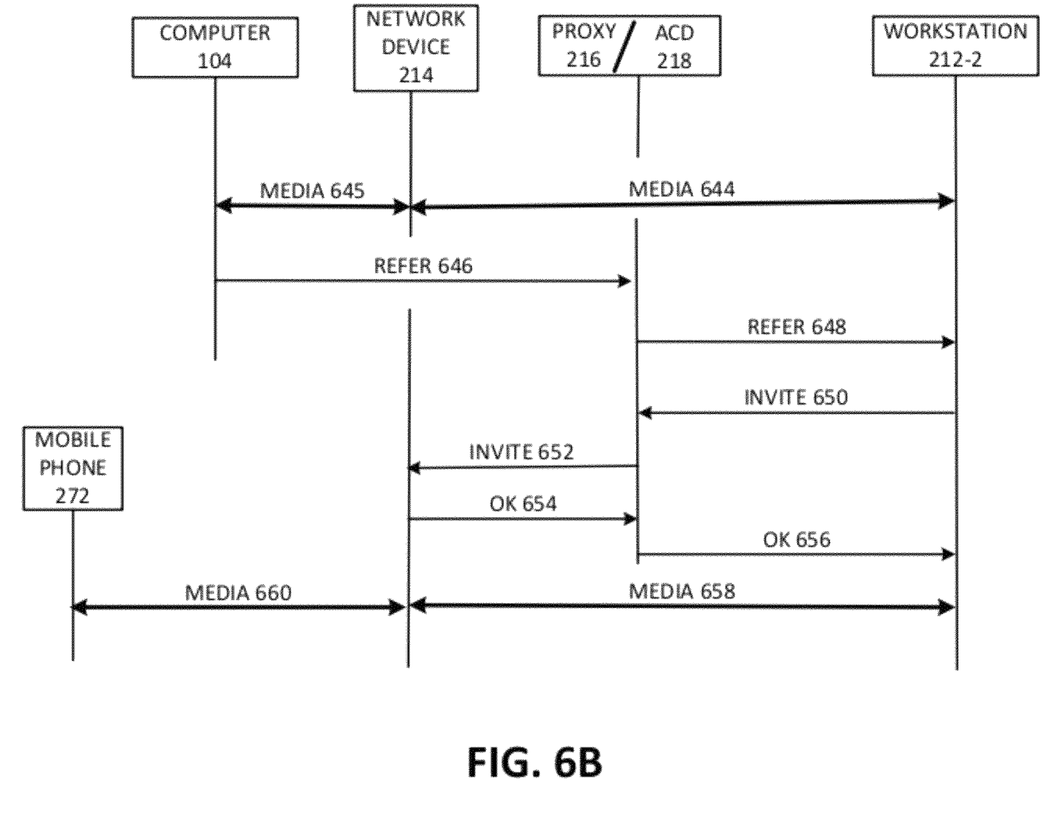

In one embodiment, the user may not wish to talk to the customer service agent using home computer 104. In this case, as shown in FIG. 6B, home computer 104 may send a REFER message 646 to proxy 216. REFER message 646 may include the identity of mobile phone 272 if, for example, the user wanted to transfer media session 644 and session 645 to mobile phone 272. Proxy 216 may forward REFER message 648 to workstation 212-2, and workstation 212-2 may send INVITE message 650 to proxy 216, and proxy 216 sends INVITE message 652 to network device 214. In this case, session 658 is established between network device 214 and workstation 212-2. Network device 214 may then establish media session 660 to mobile phone 272 that network device 214 connects to media session 658 to put the customer service agent at workstation 212-2 in contact with the user.

While process 500 has been described with respect to home computer 104 and workstation 212-x, process 500 may also be implemented with respect to kiosk 274 and workstation 212-x. For example, if a transaction has failed at a bank's ATM, a customer could initiate a chat or call between the bank's customer service agent and the customer. Thus, the customer, standing in front of the ATM (e.g., kiosk 274), could have an IM chat or conversation with a customer service representative at workstation 212-x. In this embodiment, the kiosk 274 may include a microphone and/or a camera. Further, the user could establish a session (or transfer a session to be) between his mobile phone and an operator at workstation 212-x. In this embodiment, the customer service agent may see the context of the session (e.g., chat or call) with the customer. The steps in process 500 may also be performed in any order.

FIG. 6A shows the context data as part of INVITE message 602. In other embodiments, a session may be initiated by workstation 212-1 instead of home computer 104, for example. In such an embodiment, the context data may be carried by OK messages rather than in INVITE messages. In other embodiments, context data may be carried (e.g., in the header) of any type of SIP message (such as a REFER message, as shown in FIG. 6A or a Re-INVITE message) or any type of H.323 message. A SIP (or H.323) compliant device may forward the header information (and thus the context information) without any modification to the SIP (or H.323) compliant device. Thus, embodiments disclosed herein may be used with legacy SIP (or H.323) equipment.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A computer-implemented method comprising:
    receiving one or more session signaling protocol messages to establish a session between a workstation and a user device, wherein the one or more session signaling protocol messages include context information, wherein the context information includes a browser history indicating one or more web sites visited by a user of the user device with a browser, wherein the user visited the one or more web sites before the receiving of the one or more session signaling protocol messages including the context information;
    establishing the session between the workstation and the user device; and
    displaying information on a display for an operator of the workstation, wherein the displayed information is based on the received context information, and wherein the displayed information indicates the browser history indicting web sites visited by the user.

2. The computer-implemented method of claim 1, further comprising:
    determining sale opportunities based on the context information; and
    displaying the sale opportunities for the operator of the workstation.

3. The computer-implemented method of claim 1, wherein the context information includes a chat history of a communication between the user and another operator.

4. The computer-implemented method of claim 1, wherein the context information includes a meaning of communications in the session between the user and the operator of the workstation.

5. The computer-implemented method of claim 1, wherein establishing the session between the workstation and the user device includes:
    selecting, based on the context information, one of a plurality of workstations; and
    establishing the session between the user device and the one of the plurality of workstations.

6. The computer-implemented method of claim 5, wherein selecting the one of the plurality of workstations includes:
    querying a database to determine the one of the plurality of workstations manned by an operator with requisite experience to handle the session; and
    selecting the one of the plurality of workstations based on the querying of the database.

7. The computer-implemented method of claim 1, wherein a first workstation includes the workstation and a first session includes the established session, the method further comprising:
    receiving one or more signaling protocol messages to establish a second session between a second workstation and the user device, wherein the one or more signaling protocol messages include information indicating the context information and additional context information.

8. The computer-implemented method of claim 7, wherein the additional context information includes a chat history between the operator of the first workstation and the user.

9. The computer-implemented method of claim 7, wherein a plurality of workstations includes the first workstation and the second workstation, wherein the context information or the additional context information includes a count of a number of sessions established between any of the plurality of workstations and the user device.

10. The method of claim 1, wherein the signaling protocol messages include session initiation protocol (SIP) messages, and wherein the context information including the browser history indicating web sites visited by the user is included in a header in one or more of the SIP messages.

11. A computer-implemented method comprising:
receiving one or more session signaling protocol messages to establish a session between one of a plurality of workstations and a user device, wherein the one or more session signaling protocol messages to establish the session include context information indicating a meaning of communications between an operator of the one of the plurality of workstations and a user of the user device in the session to be established by the one or more session signaling protocol messages,
wherein the one or more session signaling protocol messages includes one or more session initiation protocol (SIP) messages, and wherein the context information indicating the meaning of the session is stored in one or more headers of the one or more SIP messages; and
establishing the session between the one of the plurality of workstations and the user device.

12. The computer-implemented method of claim 11, wherein the context information includes a chat history or a browser history associated with a user of the user device, and wherein the chat history is stored in one or more headers of the one or more SIP messages.

13. The computer-implemented method of claim 11, wherein establishing the session between the one of the plurality of workstations includes establishing the session based on the context information.

14. The computer-implemented method of claim 13, further comprising:
querying a database to determine, based on the context information, the one of the plurality of workstations manned by an operator with experience to handle the session; and
selecting the one of the plurality of workstations based on the querying of the database, wherein establishing the session includes establishing the session between the selected one of the plurality of workstations and the user device.

15. The computer-implemented method of claim 14, further comprising displaying information indicating the context information on a display for an operator of the workstation.

16. A system comprising:
a workstation comprising a display; and
a network device comprising:
a transceiver to receive one or more signaling protocol messages to establish a session between the workstation and a user device, wherein the one or more signaling protocol messages include context information, wherein the context includes a browser history associated with a user of the user device, wherein the browser history indicates one or more web sites visited by the user in a browser, wherein the user visited the one or more web sites before the receiving of the one or more session signaling protocol messages including the context information, and
a processor to establish the session between the workstation and the user device,
wherein the display of the workstation is configured to display the context information, including the browser history, for an operator to view.

17. The system of claim 16, wherein the context information indicates a meaning of intended communications, in the session, between the user of the user device and an operator associated with the workstation.

18. The system of claim 17, further comprising a plurality of workstations, wherein the processor selects, based on the context information, one of the plurality of workstations for establishing the session and establishes the session between the selected one of the plurality of workstations and the user device.

19. The system of claim 18, further comprising:
a storage device including a database to store experience information associated with each of a plurality of operators associated with a corresponding one of the plurality of workstations; and
wherein the processor selects the one of the plurality of workstations based on the experience information associated with the plurality of operators.

20. The system of claim 16, wherein a first workstation includes the workstation and a first session includes the established session, wherein the transceiver is further configured to receive one or more signaling protocol messages to establish a second session between a second workstation and the user device, wherein the one or more signaling protocol messages include information indicating the context information and additional context information.

21. The system of claim 20, wherein a plurality of workstations includes the first workstation and the second workstation, wherein the context information or the additional context information includes a count of a number of sessions established between any of the plurality of workstations and the user device.

22. The system of claim 16, wherein the signaling protocol messages include session initiation protocol (SIP) messages, and wherein the context information including the browser history indicating the web sites visited by the user is included in a header in one or more of the SIP messages.

* * * * *